(12) United States Patent
Paxton

(10) Patent No.: US 7,805,793 B2
(45) Date of Patent: Oct. 5, 2010

(54) SUBMERSIBLE VACUUM CLEANER

(75) Inventor: Andrew Paxton, Wellington (GB)

(73) Assignee: Interpet Limited (GB)

( * ) Notice: Subject to any disclaimer, the term of this patent is extended or adjusted under 35 U.S.C. 154(b) by 0 days.

(21) Appl. No.: 12/146,525

(22) Filed: Jun. 26, 2008

(65) Prior Publication Data
US 2008/0313827 A1 Dec. 25, 2008

Related U.S. Application Data

(63) Continuation of application No. PCT/GB2006/004860, filed on Dec. 21, 2006.

(30) Foreign Application Priority Data
Dec. 29, 2005 (GB) .............................. 0526528.5

(51) Int. Cl.
*E04H 4/16* (2006.01)
(52) U.S. Cl. ........................................................ 15/1.7
(58) Field of Classification Search .................... 15/1.7, 15/300.1, 344, 347, 350
See application file for complete search history.

(56) References Cited
U.S. PATENT DOCUMENTS

| | | | | |
|---|---|---|---|---|
| 5,317,776 A | * | 6/1994 | DeMoura | ..................... 15/1.7 |
| 5,641,399 A | * | 6/1997 | Rawlins | ................. 210/167.12 |
| 5,842,243 A | * | 12/1998 | Horvath et al. | ................ 15/1.7 |
| 6,017,400 A | * | 1/2000 | Clark et al. | ................... 134/21 |

OTHER PUBLICATIONS

Hozelock, "Pond Vac product features," available at http://www.hozelock.com/aquatics/pond-vadpond-vac-2.html; retrieved on Aug. 18, 2008 (1 page).
Hozelock, "Perfect Ponds Made Simple," available at http://www.hozelock.com/uploads/pdf/33752UK.pdf; retrieved on Aug. 18, 2008 (28 pages).

* cited by examiner

*Primary Examiner*—Shay L Karls
(74) *Attorney, Agent, or Firm*—Grossman, Tucker, Perreault & Pfleger, PLLC

(57) ABSTRACT

Apparatus for facilitating the removal of material deposited at the bottom (6) of a volume of liquid (7) the apparatus including a suction pump assembly (2) associated with a suction head/nozzle (9) mounted to a user handling element (4) and means (24) drivable by the motor for displacing sucked-in water and (8) to a delivery location (11), in such manner that when used in use the pump assembly (2) can be submerged, and wherein the suction pump assembly (2) includes means (40) for enabling controlled air escape from the vicinity of the means (24) for displacing air from of the pump assembly the arrangement being such as to prevent air blockage of and material flow through the pump following raising of the latter of water.

10 Claims, 2 Drawing Sheets

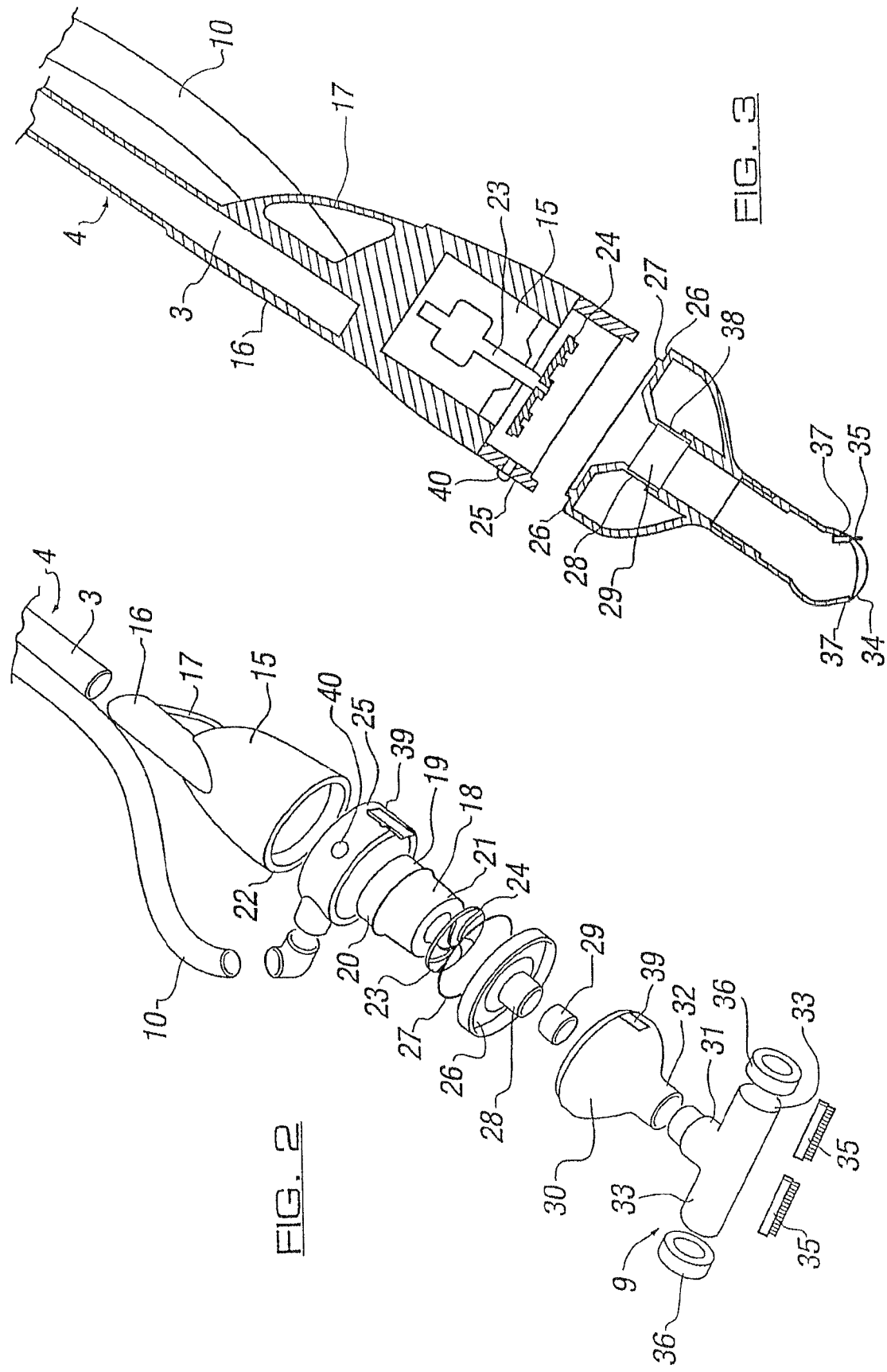

SUBMERSIBLE VACUUM CLEANER

CROSS REFERENCE TO RELATED APPLICATIONS

This application is a continuation of International Application No. PCT/GB2006/004860 filed Dec. 21, 2006 and published Jul. 5, 2007 as International Publication No. WO 2007/074335, designating the United States, and which claims benefit of Great Britain Application No. 0526528.5 filed Dec. 29, 2005, the teachings of which are incorporated herein by reference.

FIELD

This invention relates to vacuum cleaners suitable for use in the removal of detritus from the bottom of a volume of water such as water within outdoor ponds and water features.

BACKGROUND

In particular one of the problems arising in connection with outdoor ponds is that wind blown debris such as plant seeds, seed cases, falling leaves etc., are able readily to fall on to the water surface and eventually sink to the bottom.

In addition, wind blown soil and/or dust can over a period of time accumulate in significant quantities within a pond.

Additional to such above mentioned materials there are the organic waste materials being produced by fish and any other aquatic creatures that may be present in the pond.

Over period of years the amounts of various types of detritus material accumulating in a pond can assume considerable proportions leading to a layer on a pond of several centimetres in depth.

A consequence of the presence of fish particularly fish fry or other small aquatic creatures within a pond is that it becomes very difficult to remove any materials deposited on the bottom of the pond without running the risk of harming such fish fry and other small creatures when attempting to remove the material, for example, by attempting to dredge the pond bottom with a container or by ladling or the like since such action produces stirring effects that distributes the waste material into the water. This stirring renders removal of the stirred material very difficult.

In order to deal with this problem it has been proposed to use an electrically operable vacuum cleaner type apparatus containing a combined motor housing and some form of container for receiving removed detritus material. When in use the apparatus is positioned adjacent to the pond and a suction head/nozzle connected to an elongate flexible tubular member serving as liquid conduit is used to 'sweep' the pond bottom, with the material sucked in by the head/nozzle travelling by way of conduit to a container the latter being located at the pond side for later removal from the apparatus.

Thus in operation water and debris is sucked out from the pond and is delivered into the container. The liquid entraining the detrius/waste material from the pond to the container is discharged either back into the pond or by way of a discharge pipe to an appropriate location for receiving such liquid discharge.

In practice it has-been found that the known apparatus involves inherent handling problems particularly in relation to the physical control of the ongoing operational positioning of the suction head/nozzle of the apparatus.

It is an object of the present invention to provide vacuum cleaners suitable for use in the removal of detritus from the bottom of a volume of water such as water within outdoor ponds and water features which are of such construction as to facilitate the operational handling thereof.

SUMMARY

Broadly according to a first aspect of the invention there is provided apparatus for facilitating the removal of material deposited at the bottom of a volume of liquid the apparatus including a suction pump assembly associated with a suction head/nozzle mounted to a user handling element and means drivable by the motor assembly for displacing sucked-in water and material to a delivery location in such manner that when in use the pump assembly can be submerged, and wherein the suction pump assembly includes means for, enabling controlled air escape from the vicinity of the means for displacing the water and material the arrangement being such as to prevent air blockage of and material flow through the pump following raising of the latter out of water.

Preferably the means for enabling an escape of air is arranged to permit a flow of water to provide indication to a user of the apparatus of o water being delivered by the pump.

In a preferred construction the apparatus as claimed in claim 1, and wherein the suction pump assembly/unit incorporates means for counterbalancing the weight of the pump and the associated suction head/nozzle.

Preferably the head/nozzle incorporates means for preventing the actual water and material inlet mouth of the suction head/nozzle from contacting the floor/bottom surface of a volume of water and for facilitating movement of the suction head/nozzle during use.

Conveniently said means for preventing said contact includes a support arrangement incorporating at least one wheel serving to support the nozzle immediately above said floor/bottom.

Broadly according to a further aspect of the invention there is provided a submergible suction apparatus for facilitating the removal of submerged material in divided form in which the suction motor of the device is intended to be immersed with its material suction means within a volume of water and in which arrangements are provided for counterbalancing the weight of the motor and associated material suction means.

In accordance with a further aspect of the invention there is provided a submergible apparatus for facilitating the removal of material in divided form from the bottom of a volume of water incorporating a suction pump and its associated material suction head/nozzle carried by a support rod for immersion within a body of water for the purposes removing material in divided form from said bottom, wherein, said suction head/nozzle incorporates means for preventing the actual mouth of the suction head/nozzle from contacting the floor/bottom surface of a volume of water, and for facilitating movement of the suction head/nozzle during use from which the collected detrius material can be subsequently removed.

Conveniently, said means for preventing said contact includes a support arrangement incorporating at least one wheel serving to support the nozzle immediately above said floor/bottom.

Conveniently also, the suction head/nozzle includes means for disturbing debris on said floor/bottom in the vicinity of the inlet mouth of the suction head/nozzle.

Preferably the disturbing means includes at least one brush.

In a preferred construction the suction pump is electrically controlled using a remotely operable control system which avoids a physical connection between a mains electrical supply for the pump and the handle assembly.

Preferably the remote control means includes a radio frequency control system.

Preferably the liquid and material are separated by passing them into a container and removing at least the bulk of the liquid from the container the liquid for transporting the liquid plus material to a reception contained wherein said material is received, and means for discharging the liquid from the apparatus

BRIEF DESCRIPTION OF THE DRAWINGS

For a better understanding of the invention and to show how to carry the same into effect reference will now be made to the accompanying drawings in which:

FIG. 2 is an exploded view of the a motor suction nozzle assembly provided in the apparatus, and FIG. 3 schematically illustrates to a larger scale a longitudinal section of the motor/nozzle assembly illustrated in FIG. 2.

DESCRIPTION

Figure 1:
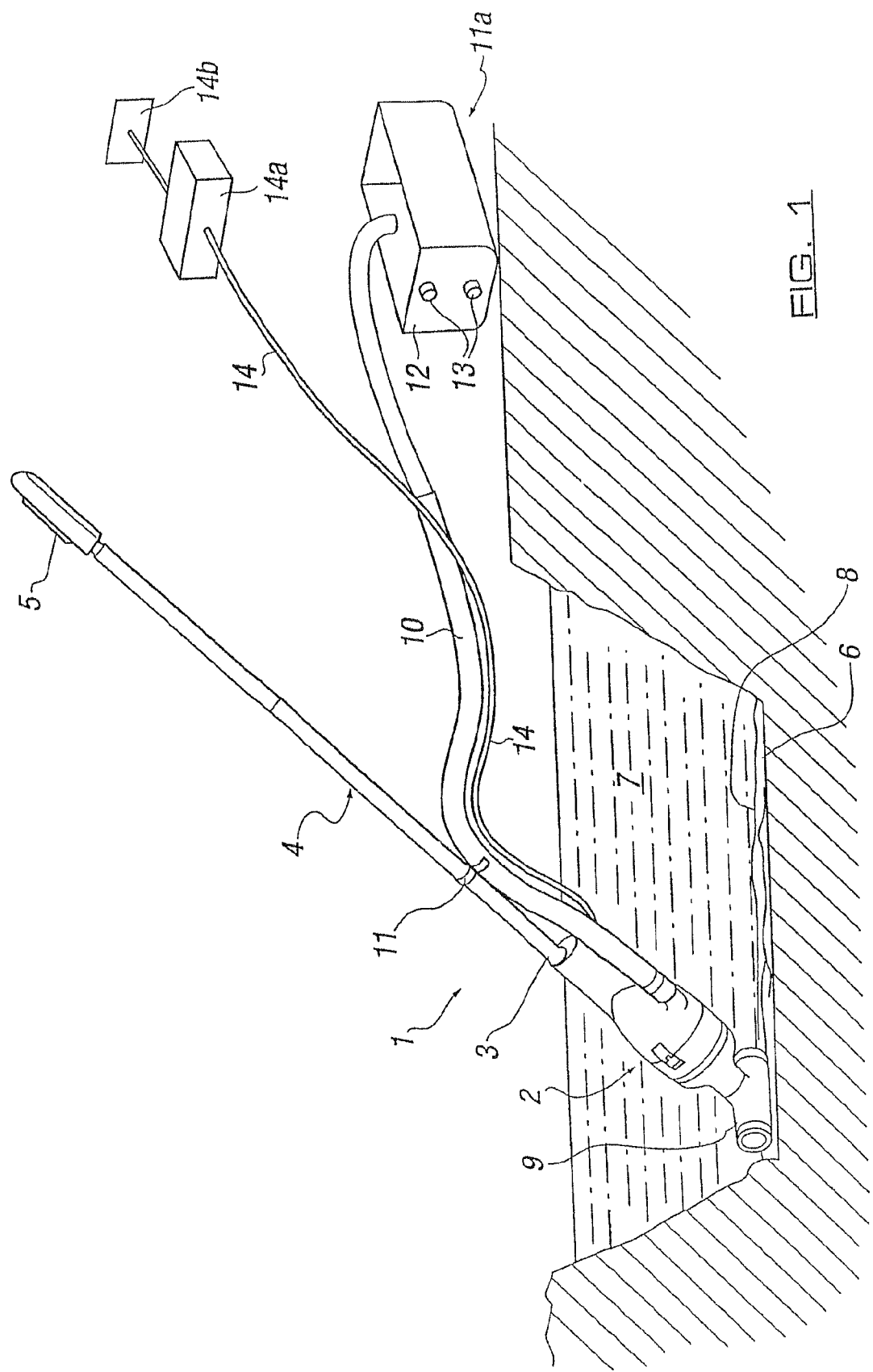
FIG. 1 very schematically illustrates the general features of suction apparatus incorporating the concepts of the invention, the Figure schematically indicating the position of the apparatus with respect to the bottom of a pond when positioned for removing material from the bottom of a pond.

Referring now to the drawings and more particularly initially to FIG. 1 which schematically illustrates the general arrangement of an embodiment of the apparatus 1 of the invention in simplified form and when in use. As will be noted the apparatus includes an electrically driven fluid suction pump assembly 2 mounted to the lower end 3 of a telescopic rod like handle assembly 4.

At this point it is convenient to note that in view of the possible dangers and risks that could arise in relation to electrical equipment that makes use of mains electricity for its operation and which during its use could come into contact with water an important aspect of the invention avoids the provision of mains electrical switches involved in the operation of the apparatus actually mounted to the apparatus of the invention.

Thus in the case of the apparatus to be described herein and mains electrical current that needs to be switched ON/OFF are actuated by way of radio frequency signals control means associated with the connections i.e., plug used to connect the apparatus to an electrical mains supply.

The control means for operating the radio frequency control arrangements includes a battery energised control unit 5 mounted to the handle assembly 4. In other words the operation of the control unit 5 produces the radio frequency signals that control the operation of the switching arrangements (to be further mentioned herein after) associated with an electrical mains connection plug or the like. Since such radio frequency switching arrangements are well known, for example, in relation to vehicle door locks, garage door locks etc., further description thereof is not considered necessary.

A particular advantage of avoiding the use of electrical cables associated with the telescopic handle assembly 4 is that the need on alteration of the handle assembly length to be able correspondingly to adjust the length of an electrical mains cable are eliminated.

The fluid suction pump assembly 2 is of such construction as to be buoyant. In practice, the requisite buoyancy is attained by the nature of the design of the motor assembly and the provision of buoyancy material.

The extent of the buoyancy is such that when the apparatus 1 is in use the user is the weight of the pump assembly 2 is effectively neutralised That is the facilitate the maintaining of a required operational setting of the pump assembly 2 with respect to a bottom surface 6 of a pond 7 from which it is required to displace material 8 that has settled thereupon.

The suction inlet side of the suction pump assembly 2 is provided with a suction head 9 (schematically illustrated) whereby the detritus material 8 can be drawn by the suction action of the pump assembly from the bottom 6 of the pond 7 (or other body of water) when the pump assembly/unit 2 is immersed.

The pump assembly/unit 2 connects with a sucked-in material discharge pipe 10 which can be appropriately clipped (as indicated) to the lower part of the handle assembly 4 by an attachment clip or clips 11 (only one being shown) whereby water and detrius material 8 displaced by the action of the pump assembly/2 moves upwards through the discharge pipe 10 to a filter unit 11A comprising suitable container 12 which collects the displaced detrius material 8 and which enables the entraining liquid to be discharged therefrom by way of outlets 13 either back into the pond 7 or to waste.

Conveniently the mains electrical supply for the pump assembly 2 is connected by way of an appropriately water proofed cable 14 that connects directly in water proof manner with the pump assembly 2. It is to be noted that the cable 14 does not electrically connect with any part of the handle assembly 4 thereby avoiding any possibility that a person handling the handle assembly when the apparatus 1 is in use there is no possibility of for the person using the apparatus making a direct contact with the mains electrical supply when using the apparatus of the invention. However, for convenience of handling the cable 14 the latter can be externally clipped to the lower part of discharge pipe 10 at least for the purposes of tidiness of the apparatus when in use. and also to avoid the cable from snagging with any plants within the pond. 7 the free end of the cable 14 is connected to a remotely operable radio frequency controlled switch 14A that is pluggable into an appropriate electric mains supply socket schematically shown at 14B.

Referring now to FIG. 2. which illustrates in exploded form the construction of pump assembly 2

The pump assembly 2 includes a motor housing 15 having at a socket part 16 at its upper end that is arranged to provided a mounting for the lower end 3 of the handle assembly 4 of which only a short length is shown in FIG. 2. A user carrying handle 17 is incorporated into the construction of the main housing part 15.

The pump assembly 2 includes an electric motor 18 having a waterproof casing that can be conveniently regarded as including a motor housing engaging inner end portion 19, an intermediate circumferential projecting rib 20 and an outer end portion. 21.

The inner end portion 19 engages in a firm manner within the motor housing 15 by engagement with internally directed ribs 22 provided in the housing construction and is inserted into the housing so that the rib 20 bears against the adjacent ends of the ribs 22.

The output shaft 23 of the motor 18 is provided with an impeller 24 which is operationally located within an impeller housing 25. The housing 25 is secured to the main housing 15 by any convenient means such as a twist locking system. The impeller housing 25 and is of such length that the outer end portion 21 of the motor casing and the impeller 24 are located within the impeller housing. The impeller housing is closed by an impeller housing cover 26 that connects with the impeller housing 25. by way of a twist lock fastening (not shown)

A sealing ring 27 which can be of the kind generally known as an 'O' ring is interposed between the impeller housing 25 and the impeller cover 26

The impeller housing cover 26 has a central hollow sleeve 28 for receiving a water/debris flow control ring 29 whose internal bore defines the water throughput area and thus the water flow rate/volume throughput of the suction assembly.

The sleeve 28 and the ring 29 are enclosed by an inlet cover/cowl 30 that is adapted to mount a generally T-shaped suction nozzle 9. As will be seen the leg 31 of the 'T' connects with the inlet side 32 of the cowl 31 whilst the cross arms 33 of the 'T; extend laterally of the leg 31.

The underside of the nozzle 9 has an elongate opening/slot 34 for enabling inlet of water/debris.

The trailing edge region of the slot 34 is provided with brushes 35 that are intended project slightly to the rear of the nozzle inlet slot 34 so to disturb material 8 present on the floor of the water volume (pond 7} whereby the suction effect is able readily to draw-in the material 8 from the bottom 6.

With a view to ensuring that the actual nozzle slot 34 is correctly spaced from the bottom 6 a tyred wheel 36 of an appropriate diameter is proved at the outer ends of the 'cross arms 33 of the 'T'

The provision of the wheels 36 avoids the risk that the edge regions 37 of the nozzle inlet slot 34 of the nozzle contacting the pond bottom 6 during the use of the apparatus of the invention. In practice this, for example, prevents the nozzle 9 from contacting any pond bottom liner that may be present which could enable the suction forces directly to suck the liner towards/into the slot 34 thereby leading to the risk that the liner becomes damaged and/of some form of damage to the motor itself With a view to controlling the flow of liquid through the inlet cowl three equiangularly spaced guide members 38 may be located in the liquid flow path the members being such as to accommodate the differing sized flow control rings 29.

Referring in particular now to FIG. 3, this Figure illustrates in sectional view the motor/suction nozzle assembly when with the associated motor assembly components located in operational positions. The Figure also illustrates that the inlet cowl 30 when spaced from the impeller cover 25. In particular FIG. 3 illustrates that the assembly 2 can be regarded as comprising two main sections, a first section including the main housing 15 and the components mounted therein and a second section including the suction nozzles 9 and its associated inlet cowl 30 the latter being adapted releasably to connect with the impeller housing by readily releasable locking clips (not shown).

To enable variation of the liquid flow through the apparatus of the invention differently sized nozzle heads can be provided.

In practice, as a result of the movements carried out by the user, the nozzle mouth may be temporarily lofted out of water so that air can be sucked into the system. This situation in practice creates an operational problem in that the weight of any water and detrius material 8 presently within the outlet conduit/pipe 10 effectively prevents the impeller from sucking in water and detrius material, whereby the pumping assembly ceases effectively to operate. That is the presence of such air could lead to the operational condition in which the motor is not able to continue to suck in water. To avoid this possibility, an air outlet duct 39 is provided in the impeller housing This duct is closed by a plug having an air outlet opening. Thus, when the pump is submerged, the impeller is once again enabled to pump water and detrius material 8. In addition to its air release function, the plug 40 allows water to escape so that at all times an indication is provided to the effect that the pump is functioning.

It should be noted that for clarity the mains lead 14 to the motor is not shown in FIGS. 2 and 3.

In use the pump assembly and its associated suction head/nozzle 9 is lowered into the body of water 7 and is positioned so that the suction head/nozzle 9 is immersed within the detrius material 8 that has accumulated at the bottom 6 of the body of water 8. The user by means of the control unit 5 switches ON the motor as above indicated to initiate suction.

By reason of the inherent buoyancy of the pump assembly/unit 2 and its wheeled suction head/nozzle 9 the user is able readily to be able to move the suction head/nozzle 9 relative to the pond bottom 7 and in so doing enables the pump assembly 2 to draw in a mixture of water and detrius material 8 from different positions of the pond bottom.

Buoyancy arrangements (not shown) can be provided, the within a housing mounted to the housing 15.

As a further point the cowl 30 can be used to store additional flow control rings 29.

What is claimed is:

1. Apparatus for facilitating the removal of material deposited at the bottom of a volume of water, the apparatus characterized by a suction pump assembly associated with a suction head/nozzle mounted to a manually-operable user handling element, said suction pump assembly including an impeller drivable by a motor assembly for displacing sucked-in water and material to an external delivery location including a filter unit outside of said volume of water in such manner that when in use said suction pump assembly can be submerged, and in that said impeller is located within an impeller housing and said impeller housing includes a plug including an air outlet opening for enabling controlled air escape from the vicinity of said impeller, so as to prevent air blockage which prevents the flow of water and material through said pump assembly following raising of said pump assembly out of the water.

2. Apparatus as claimed in claim 1, wherein said air outlet opening allows the flow of water to provide an indication to a user of the apparatus of water being delivered by the pump without it being necessary to raise the actual water and material inlet mouth of the suction head/nozzle out of the water in which the inlet mouth is operationally submerged.

3. Apparatus as claimed in claim 1, and characterized in that said suction pump assembly incorporates means for counterbalancing the weight of said pump and the associated suction head/nozzle.

4. Apparatus as claimed in claim 1, and characterised in that said suction head/nozzle includes an inlet slot having edge regions and means for preventing said edge regions of said inlet slot of said suction head from contacting a floor/bottom surface of said volume of water-and for facilitating movement of said suction head/nozzle during use.

5. Apparatus as claimed in claim 4, and characterised in that said means for preventing said contact includes a support arrangement incorporating at least one wheel serving to support the nozzle immediately above said floor/bottom.

6. Apparatus as claimed in claim 4, and characterised in that said suction head/nozzle includes means for distributing debris on said floor/bottom in the vicinity of said inlet slot of said suction head/nozzle.

7. Apparatus as claimed in claim 6, and characterised in that said distributing means includes at least one brush.

8. Apparatus as claimed in claim 1, and characterised in that said suction pump assembly is arranged to be electrically controllable using a remotely operable control system which avoids a physical connection between a mains electrical supply for said pump assembly and said manually-operable user handling element for the apparatus.

9. Apparatus as claimed in claim 8, and characterised in that said remote control system includes a radio frequency control system.

10. Apparatus as claimed in claim 1, and characterised in that filtration means are provided for enabling separation of said water from entrained material, including a container to which said water and material are arranged to be passed, and means for enabling removal of at least a bulk of the water from said container.

\* \* \* \* \*